(12) United States Patent
Ware et al.

(10) Patent No.: US 10,300,644 B2
(45) Date of Patent: May 28, 2019

(54) MODULAR POD FOR A MOLD

(71) Applicant: Tessy Plastics Corporation, Elbridge, NY (US)

(72) Inventors: Dale K. Ware, Fulton, NY (US); Robert Lippert, East Aurora, NY (US); Gabor Bertalan, Darien Center, NY (US)

(73) Assignee: Tessy Plastics Corporation, Elbridge, NY (US)

( * ) Notice: Subject to any disclaimer, the term of this patent is extended or adjusted under 35 U.S.C. 154(b) by 216 days.

(21) Appl. No.: 15/360,100

(22) Filed: Nov. 23, 2016

(65) Prior Publication Data
US 2017/0144349 A1    May 25, 2017

Related U.S. Application Data

(60) Provisional application No. 62/259,156, filed on Nov. 24, 2015.

(51) Int. Cl.
  *B29C 45/40*  (2006.01)
  *B29C 45/26*  (2006.01)

(52) U.S. Cl.
  CPC .......... *B29C 45/40* (2013.01); *B29C 45/2675* (2013.01)

(58) Field of Classification Search
  CPC ........ B29C 45/40; B29C 45/265; B29C 43/00
  See application file for complete search history.

(56) References Cited

U.S. PATENT DOCUMENTS

| | | | | |
|---|---|---|---|---|
| 3,534,443 A | * | 10/1970 | Tucker | B29C 45/26 249/63 |
| 4,497,624 A | * | 2/1985 | Brun | B29C 45/26 425/548 |
| 5,827,548 A | * | 10/1998 | Lavallee | B29C 45/14073 425/116 |
| 2016/0107354 A1 | * | 4/2016 | Holderman | B29C 45/2675 264/328.1 |
| 2017/0203480 A1 | * | 7/2017 | Lamb K | B29C 33/306 |
| 2018/0056562 A1 | * | 3/2018 | Kori | B29C 45/27 |
| 2018/0133941 A1 | * | 5/2018 | Hur | B29C 45/14598 |

* cited by examiner

*Primary Examiner* — Nahida Sultana
(74) *Attorney, Agent, or Firm* — Barclay Damon, LLP

(57) ABSTRACT

A modular pod for an injection mold includes a molding insert shaped to produce a molded part. The modular pod can be linked with a plurality of additional modular pods to form an injection mold. When a molding insert experiences a problem, the molding insert can be removed from the mold and replaced with a replacement insert. The modular pod employs a mechanical solution to eject the formed parts from the mold, without employing hydraulics.

14 Claims, 22 Drawing Sheets

MODULAR POD FOR A MOLD

CROSS-REFERENCE TO RELATED APPLICATION

This application claims the benefit and priority of U.S. Patent Application Ser. No. 62/259,156, filed Nov. 24, 2015, and entitled MODULAR POD FOR A MOLD, the entirety of which is incorporated herein by reference.

FIELD OF THE INVENTION

The invention relates to a plastics mold and, more particularly, to a replaceable modular pod for the plastics mold.

BACKGROUND OF THE INVENTION

Plastics are used to make a variety of items. For example, plastics can be used to make a variety of toiletry items, such as shampoo bottles, deodorant applicators, and tampon applicators, among others. Such items are typically made using a plastics mold. These molds can have, for example, a plurality of cavities shaped to produce the plastic item. The mold can be served by a piping system. In an example, each pair of cavities can be serviced by a pipe of the piping system that supplies the flowable material, such as liquefied plastic, to the cavities via a pair of supply lines coupled to the pipe and the cavities.

Typically, when a cavity experiences a problem, the pipe that services that cavity is deactivated and the production line continues to run until too many pipes are inactive and the production level of the mold falls below a particular threshold. At that point, the production line has to be halted while the defective cavity(s) is repaired. These repairs can take up to a week or more, costing money for each day that the production line is inactive.

SUMMARY OF THE INVENTION

A modular pod for an injection mold includes a molding insert shaped to produce a molded part. The modular pod can be linked with a plurality of additional modular pods to form an injection mold. When a molding insert experiences a problem, the molding insert can be removed from the mold and replaced with a replacement insert. The modular pod employs a mechanical solution to eject the formed parts from the mold, without employing hydraulics.

In one embodiment, a method for ejecting a molded part from a mold is described. The mold includes at least one molding insert removably coupled to a plate, the molding insert including a first molding insert section and a second molding insert section that contacts the first molding insert section to form a molded part. A first sine bar is coupled to the first molding insert section and a second sine bar is coupled to the second molding insert section, each sine bar having a roller slot. At least one roller is coupled to each of the first and second molding insert sections, the at least one roller received in the roller slot of each sine bar when the first and second molding insert sections are in contact with each other.

The method includes activating the first and second sine bars to separate the first molding insert section from the second molding insert section. The method further includes moving the first and second sine bars along the first and second molding insert sections. Said moving causes the at least one roller to roll out of the roller slot of each of the first and second sine bars and make contact with the first and second molding insert sections to release the molded part from the mold.

In another embodiment, a modular pod for an injection mold is described. The modular pod includes a first plate, a second plate adjacent to the first plate, a first molding insert releasably coupled to the first plate, and a second molding insert releasably coupled to the second plate. The second molding insert is configured to releasably contact the first molding insert to form a part mold.

The second molding insert includes a first molding insert section and a second molding insert section adjacent to the first molding insert section and configured to make contact with the first molding insert section to define the second molding insert. A first sine bar is coupled to the first molding insert section and a second sine bar is coupled to the second molding insert section, each sine bar having a roller slot. At least one roller is coupled to each of the first molding insert section and the second molding insert section. Each roller is configured to be received in the roller slot of each sine bar when the first molding insert section is in contact with the second molding insert section. The first molding insert is configured to be removed from the first plate and the second molding insert is configured to be removed from the second plate upon malfunction.

In another embodiment, an injection mold is described. The injection mold includes a first modular pod including a plurality of removable molding inserts and a second modular pod comprising a second plurality of removable molding inserts. Each of the removable molding inserts include a first molding insert section and a second molding insert section adjacent to the first molding insert section and configured to make contact with the first molding insert section to define the removable molding insert. A first sine bar is coupled to the first molding insert section and a second sine bar is coupled to the second molding insert section, each sine bar having a roller slot. At least one roller is coupled to each of the first molding insert section and the second molding insert section, each roller configured to be received in the roller slot when the first molding insert section is in contact with the second molding insert section. Each molding insert of the plurality of removable molding inserts and the second plurality of removable molding inserts is configured to be removed when identified as malfunctioning.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. The drawings are not necessarily to scale, emphasis generally being placed upon illustrating the features of certain embodiments of the invention. Thus, for further understanding of the nature and objects of the invention, reference can be made to the following detailed description, read in connection with the drawings in which.

DETAILED DESCRIPTION OF THE INVENTION

Figure 1:
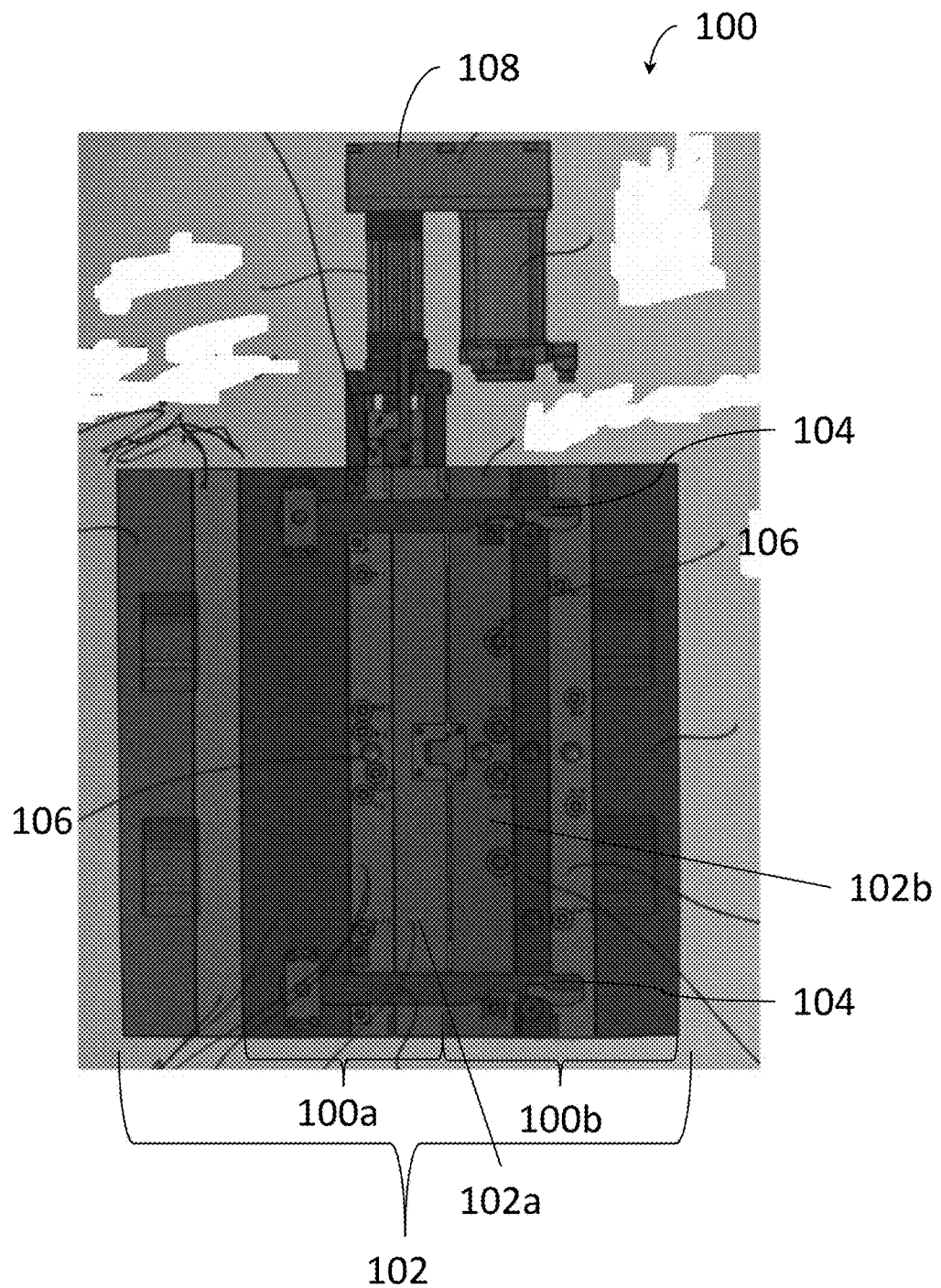
FIG. 1 is a side view of an embodiment of a modular pod.

FIG. 1 is a side view of an embodiment of a modular pod 100 for an injection mold. The modular pod 100 can be included in an injection mold. For example, an injection mold can include a plurality of modular pods 100 coupled together via any suitable means. As will be discussed further below, each modular pod 100 produces a plurality of molded parts per cycle. The number of modular pods 100 coupled together to form the injection mold can be determined based on the number of parts desired to be produced per cycle.

Figure 20:
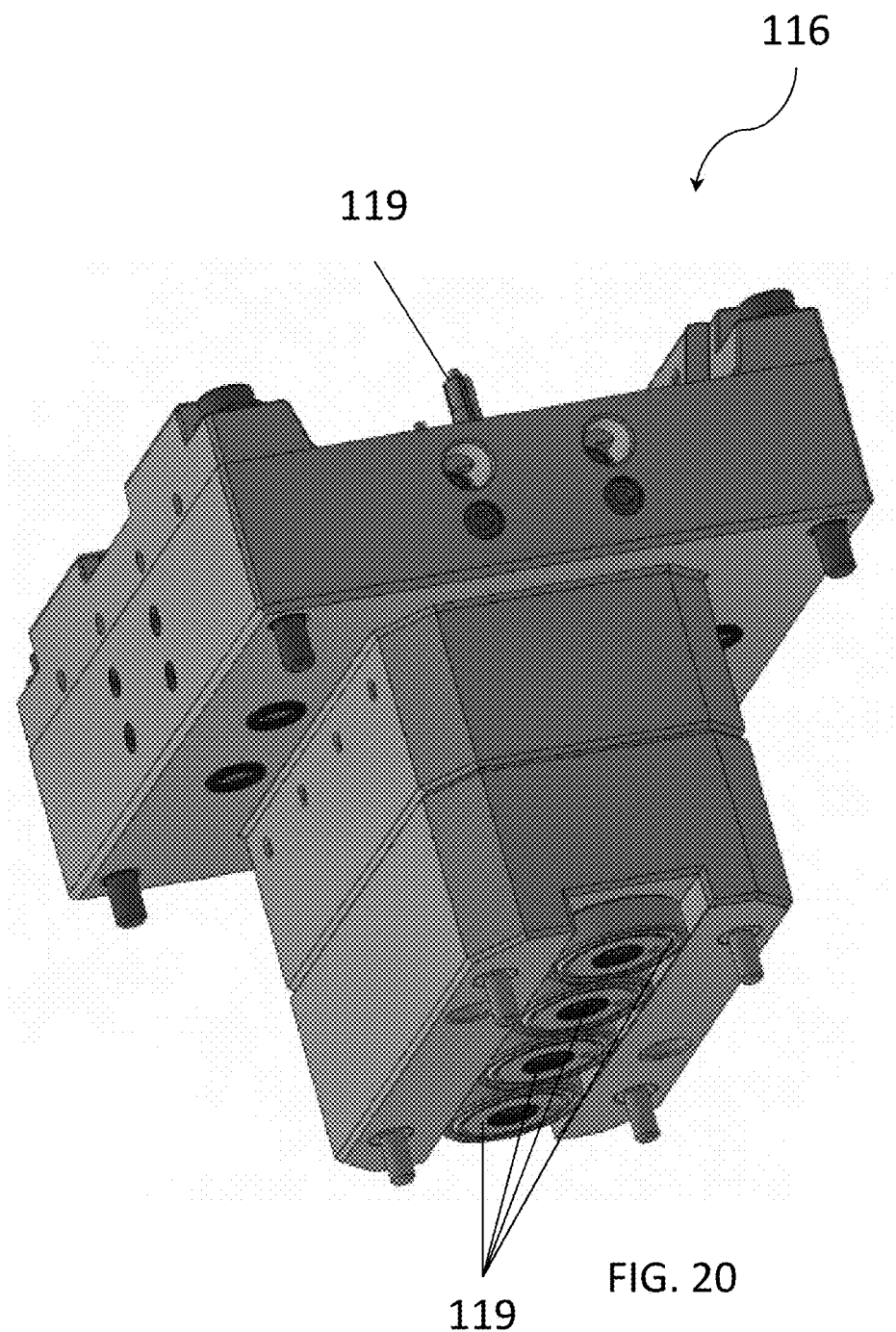
FIG. 20 is a bottom isometric view of the core insert.
Figure 21:
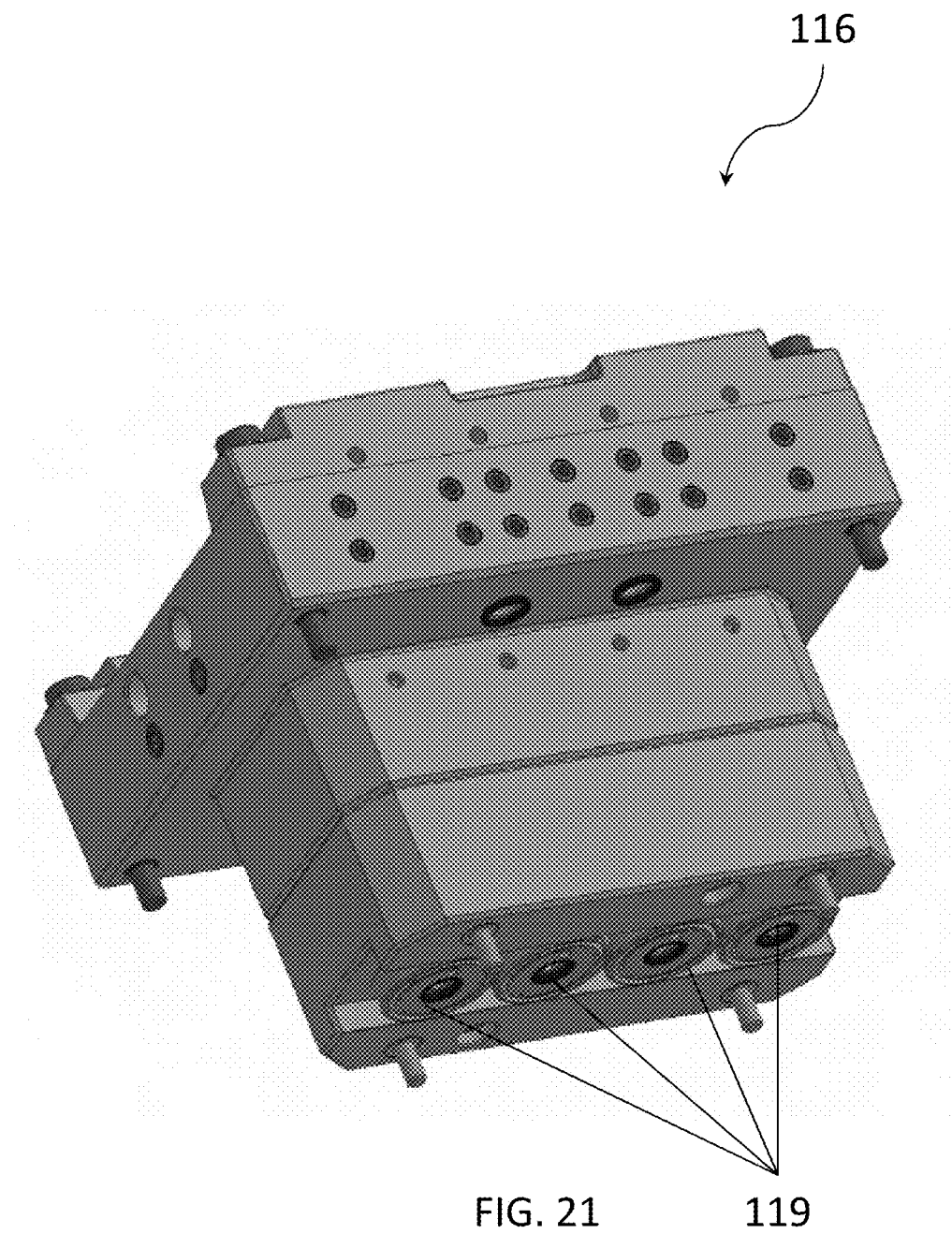
FIG. 21 is another bottom isometric view of the core insert.

The modular pod 100 includes a plurality of layers or plates 102, which include, for example, clamp plates, a manifold plate, a hot runner plate, a gate drop plate, and a stripper plate, among others. The plates 102 can be formed of any suitable material and, in an example, the material of the plates 102 can be selected based on the material from which the molded parts are formed. Latches 104 hold the plates together for sequencing during the injection molding cycle. The modular pod 100 includes coolant line couplers 106 for coupling to coolant lines (not shown). In addition, the modular pod 100 includes a sine bar connector link 108 for operating a sine bar 110 (FIGS. 20A-B). to eject the molded part, as will be discussed further below.

Figure 2:
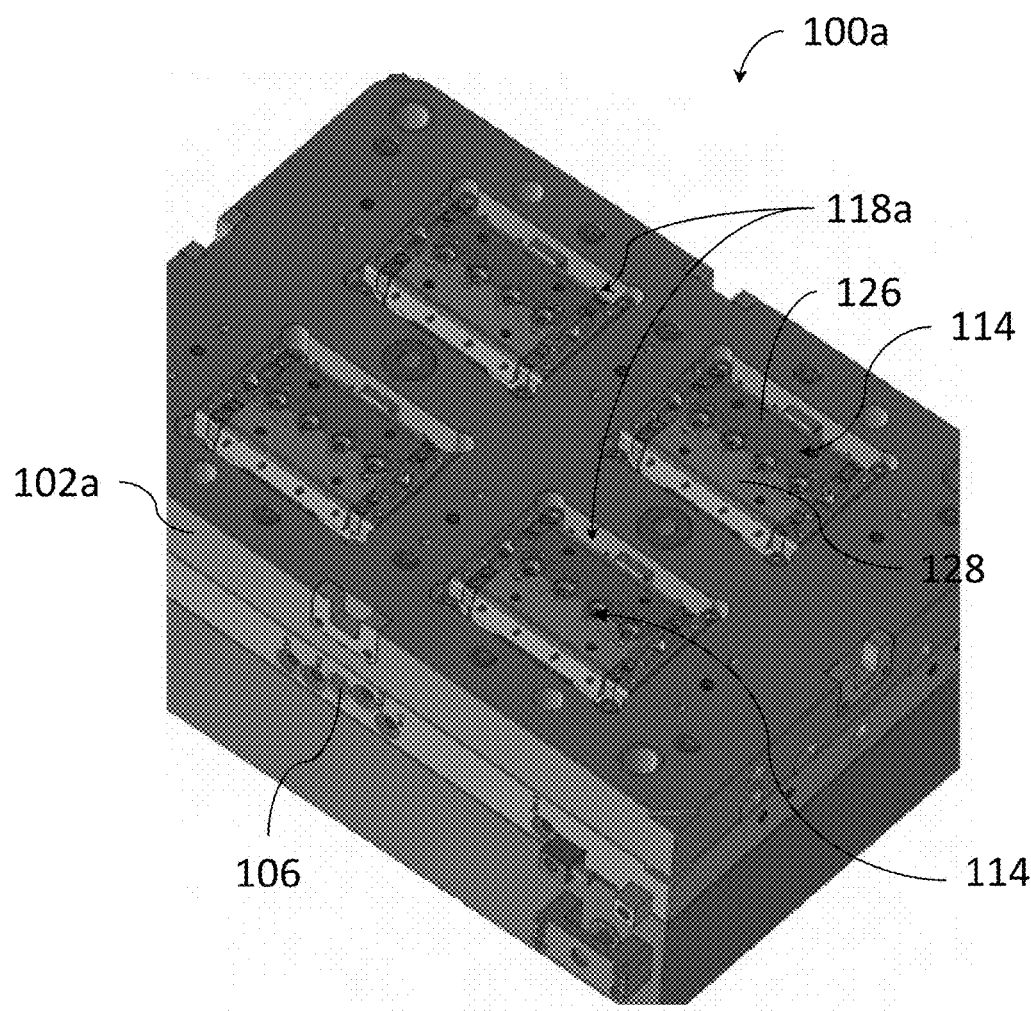
FIG. 2 is a an isometric view of a section of the modular pod.
Figure 3:
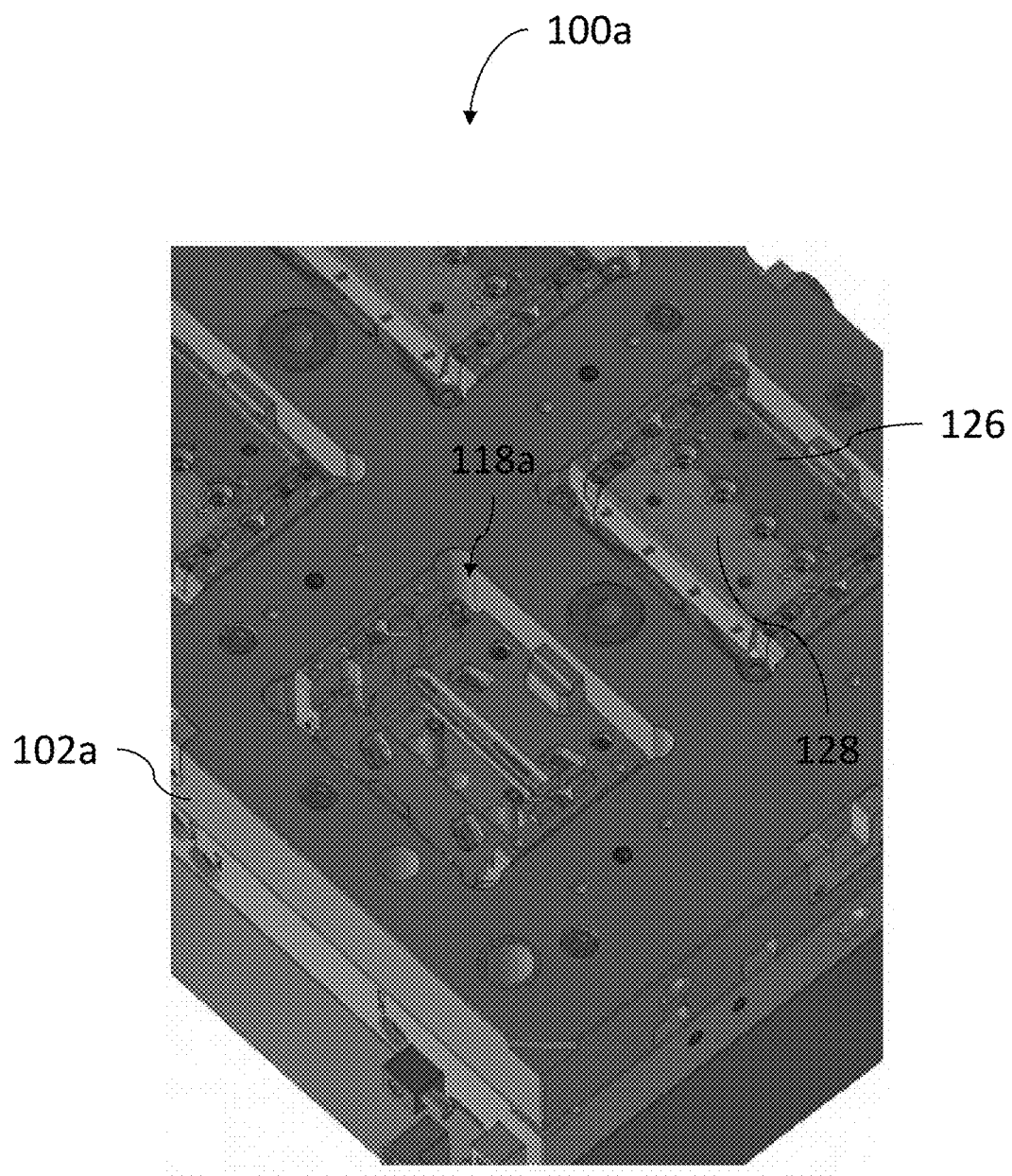
FIG. 3 is a partial isometric view of the section of the modular pod with a cavity insert removed.
Figure 4:
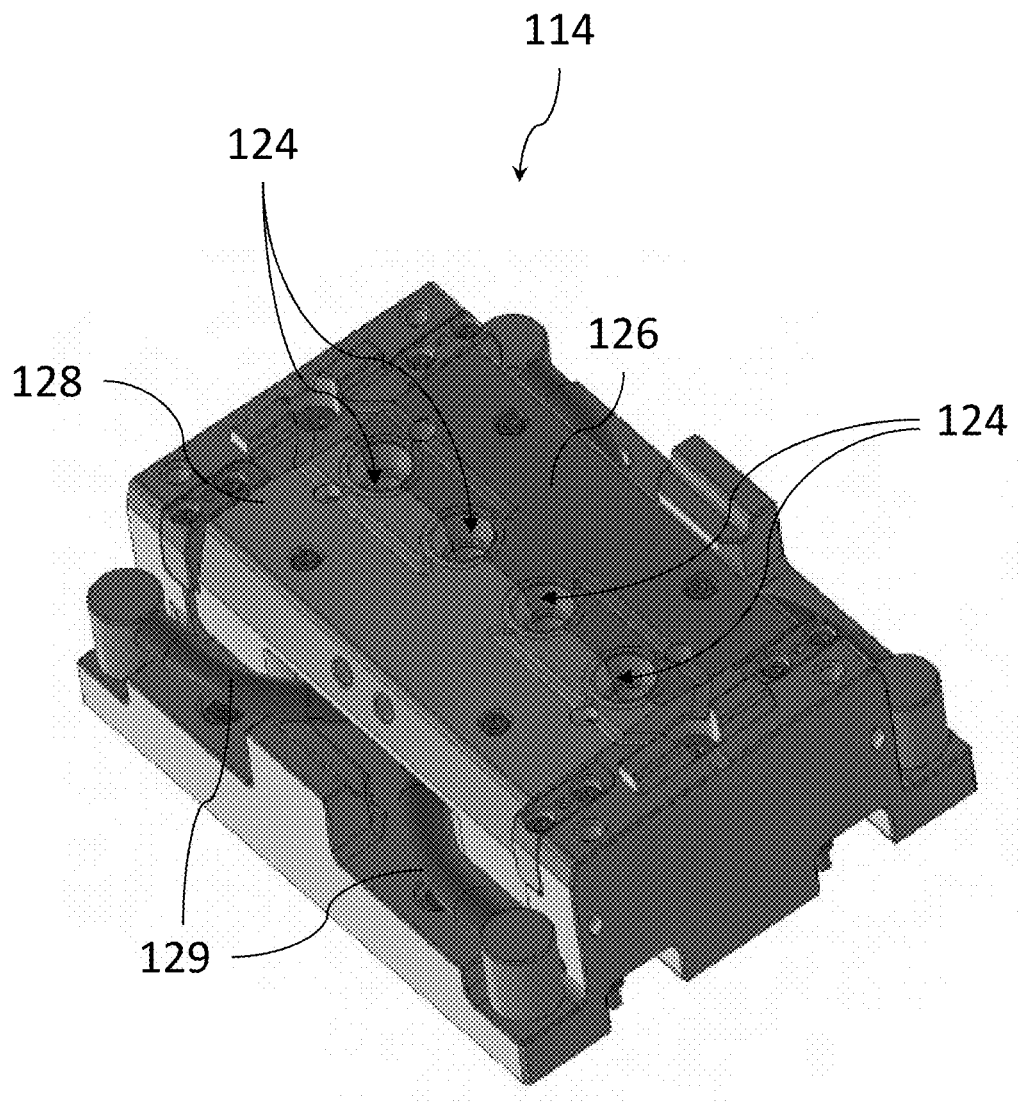
FIG. 4 is a top isometric view of the cavity insert.
Figure 5:
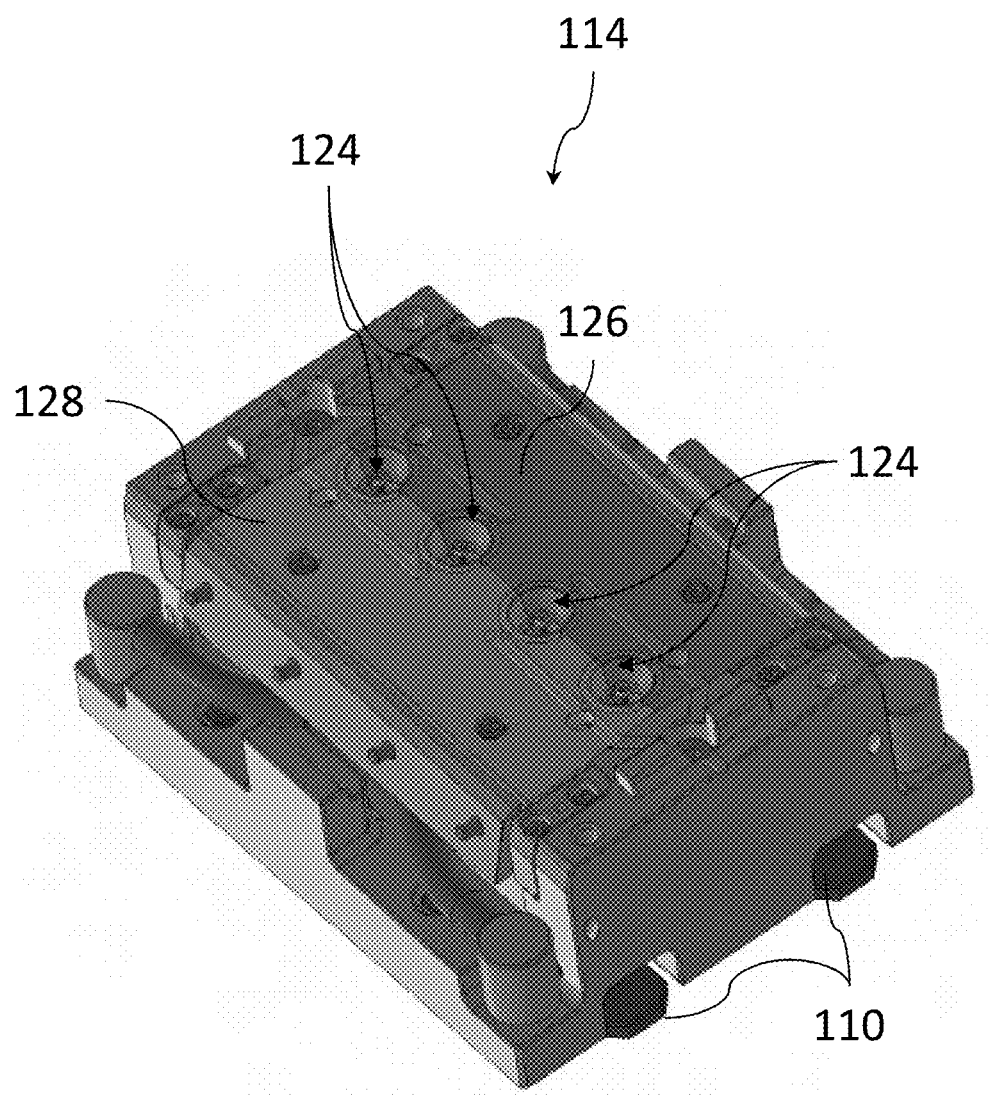
FIG. 5 is another top isometric view of the cavity insert.
Figure 6A:
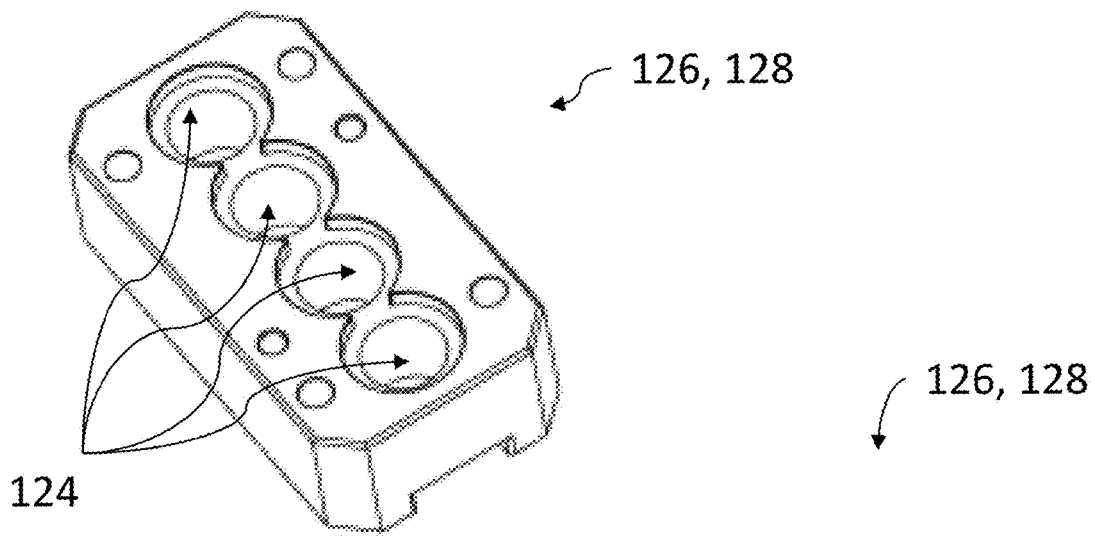
FIGS. 6A-B are illustrative views of a portion of the cavity insert.
Figure 6B:
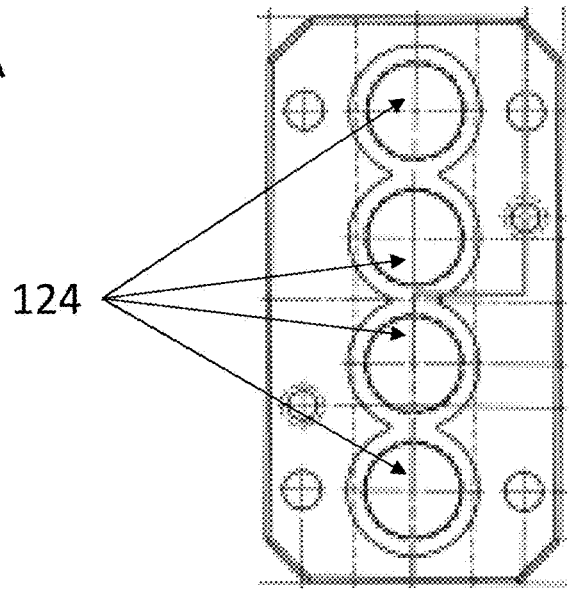

FIG. 2 is an isometric view of a first section 100a of the modular pod 100 showing a first type of molding insert, which in this embodiment is a cavity insert 114. As illustrated by FIGS. 2-3, the first section 100a of the modular pod 100 receives a plurality of cavity inserts 114 in a plurality of openings 118a of a first plate 102a. It is to be noted that the modular pod 100 can include any suitable number of molding inserts. In the illustrated example, the modular pod 100 includes four (4) cavity inserts 114. The cavity inserts 114 can be coupled to the plate 102a by any suitable means. For example, the cavity inserts 114 can be coupled to the plate 102a by a snap-fit, a friction fit, or a fastener, among others.

As particularly illustrated by FIGS. 4-7, each cavity insert 114 defines a plurality of mold cavities 124 in which parts are molded. The mold cavities 124 are shaped to form the desired final shape of molded parts. For example, the mold cavities 124 can be shaped to form the outer surface of a molded part. Each cavity insert 114 includes a first cavity insert section 126 and a second cavity insert section 128 adjacent to the first cavity insert section 126. Each cavity insert section 126, 128 forms half of the cavity insert 114 and half of the mold cavities 124 and together form the full cavity insert 114 and the full mold cavities 124. As will be further discussed below, the first cavity insert section 126 and second cavity insert section 128 engage or contact each other to form the molded parts and disengage or separate from each other to eject said molded parts.

Figure 7:
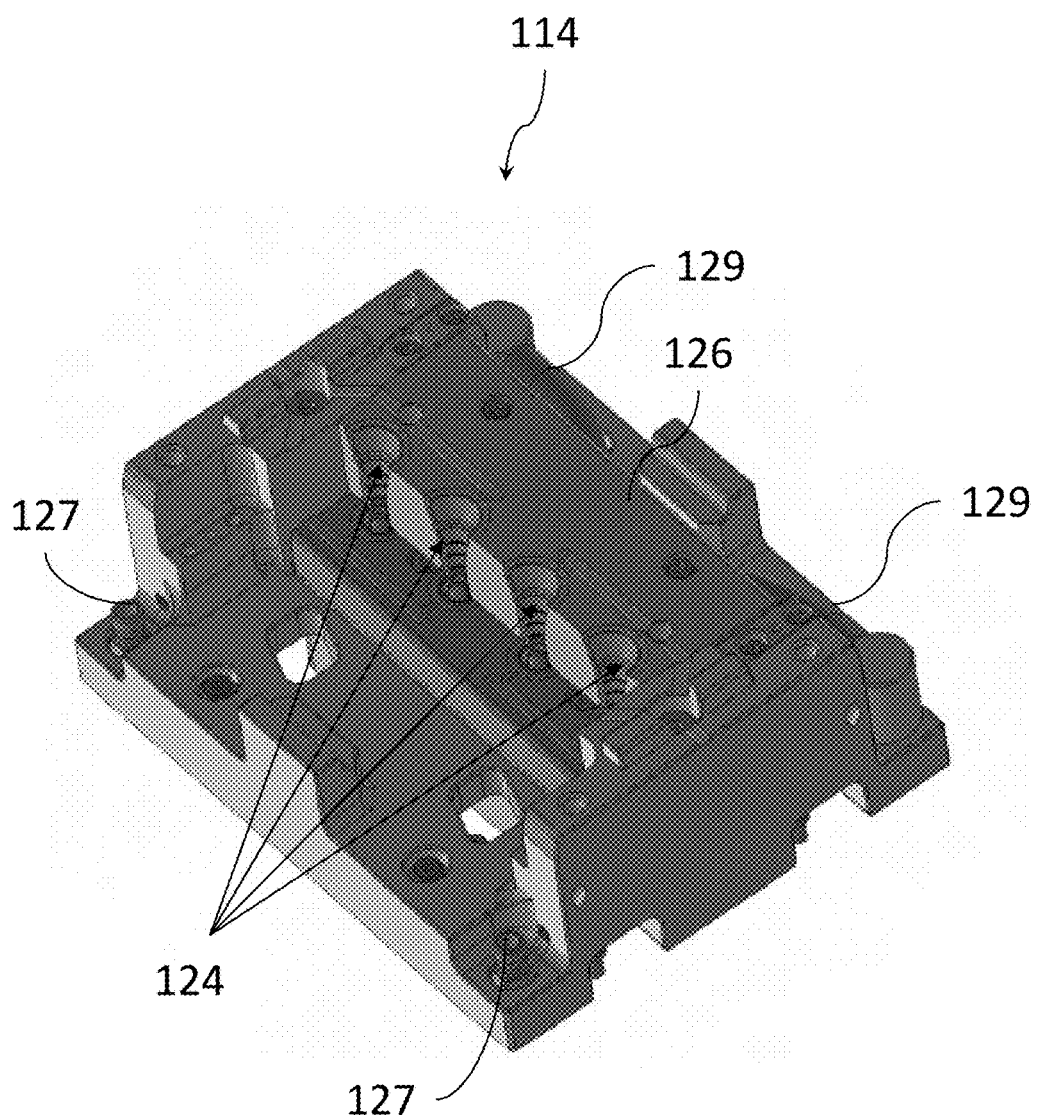
FIG. 7 is a top isometric view of the cavity insert with one side removed.

Each modular pod 100 includes at least one supply line 129. The supply line(s) 129 couples to a pipe (not shown) of the piping system to supply flowable material to the modular pod 100. As illustrated by FIG. 7, the supply lines 129 couple to a supply connector 127 on the cavity insert 114 to supply the flowable material to the cavity insert 114. The molded part can be formed of any suitable material such as plastic or metal, among others.

Figure 8:
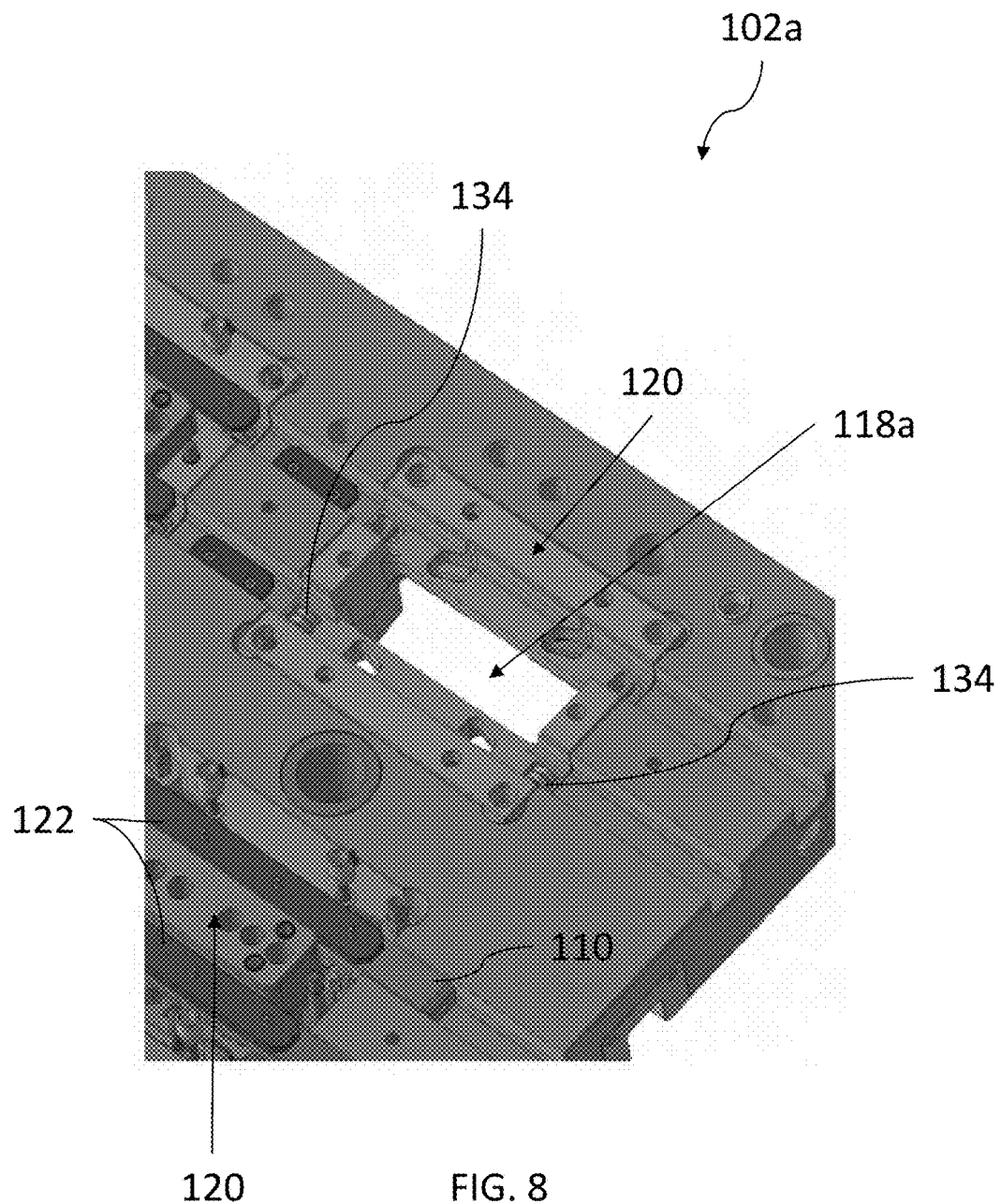
FIG. 8 is a partial isometric view of the bottom surface of a layer of the modular pod.
Figure 9:
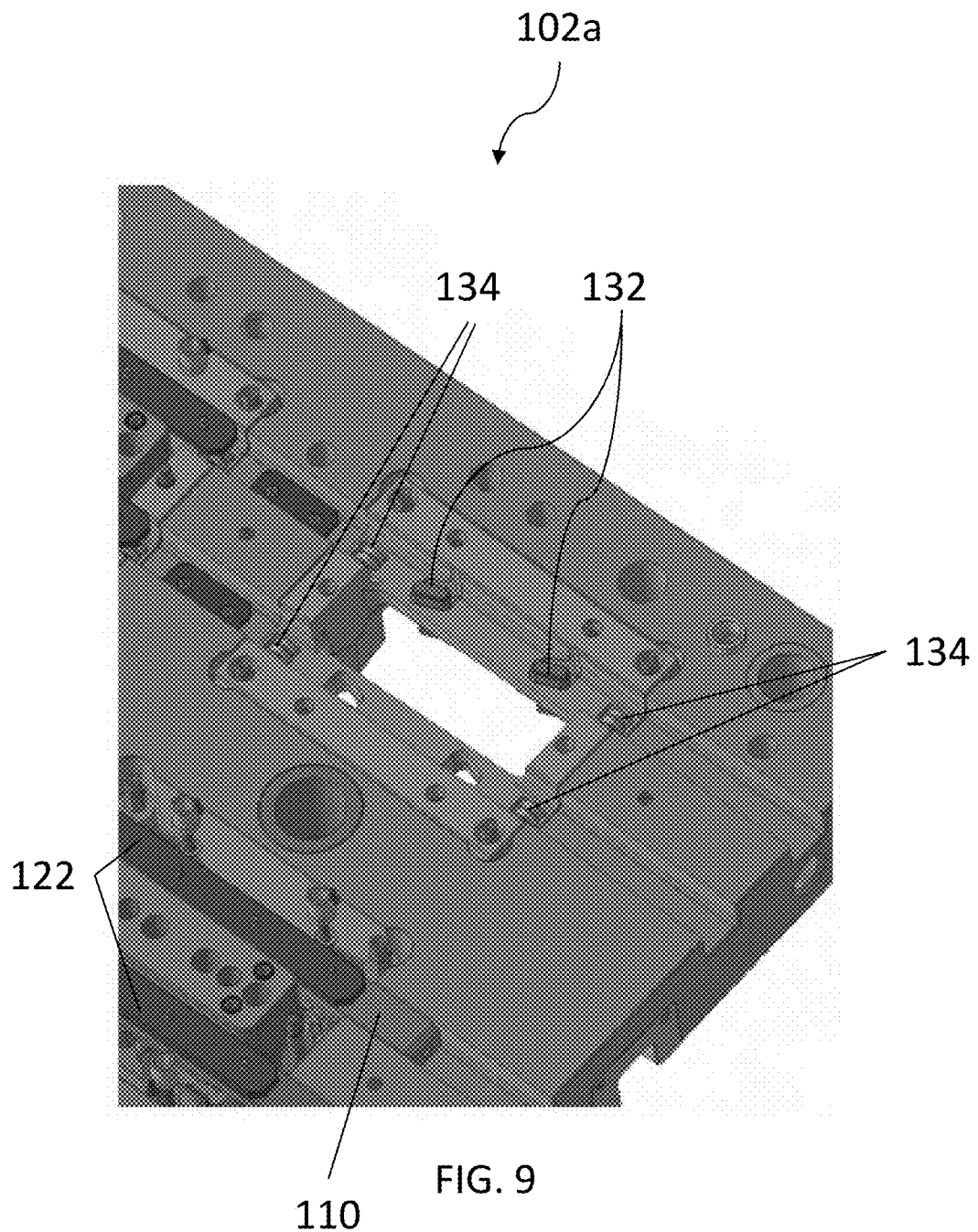
FIG. 9 is another partial isometric view of the bottom surface of the layer of the modular pod.
Figure 10:
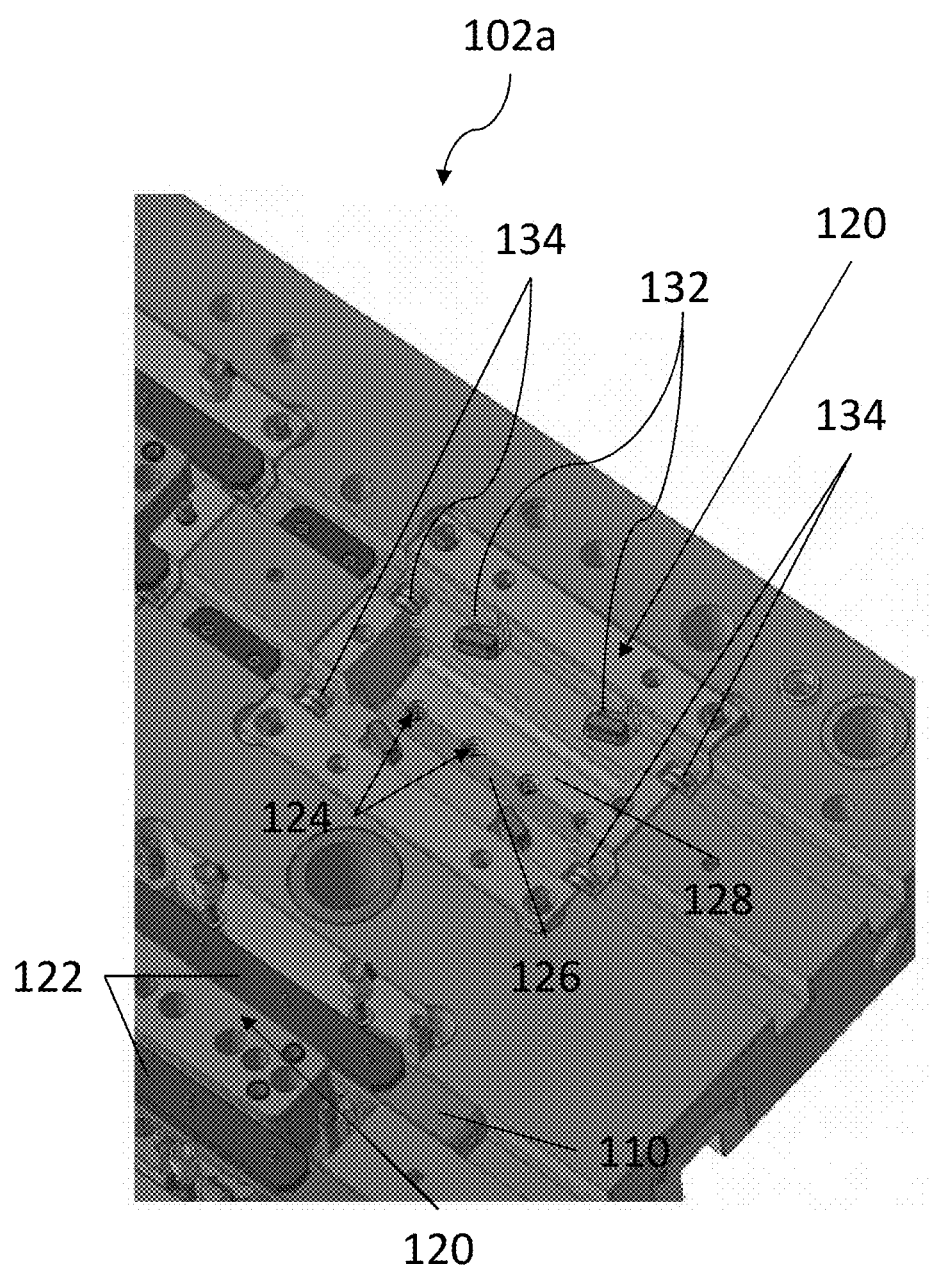
FIG. 10 is a partial isometric view of the bottom surface of the layer of the modular core in which the sine bars are received.
Figure 11:
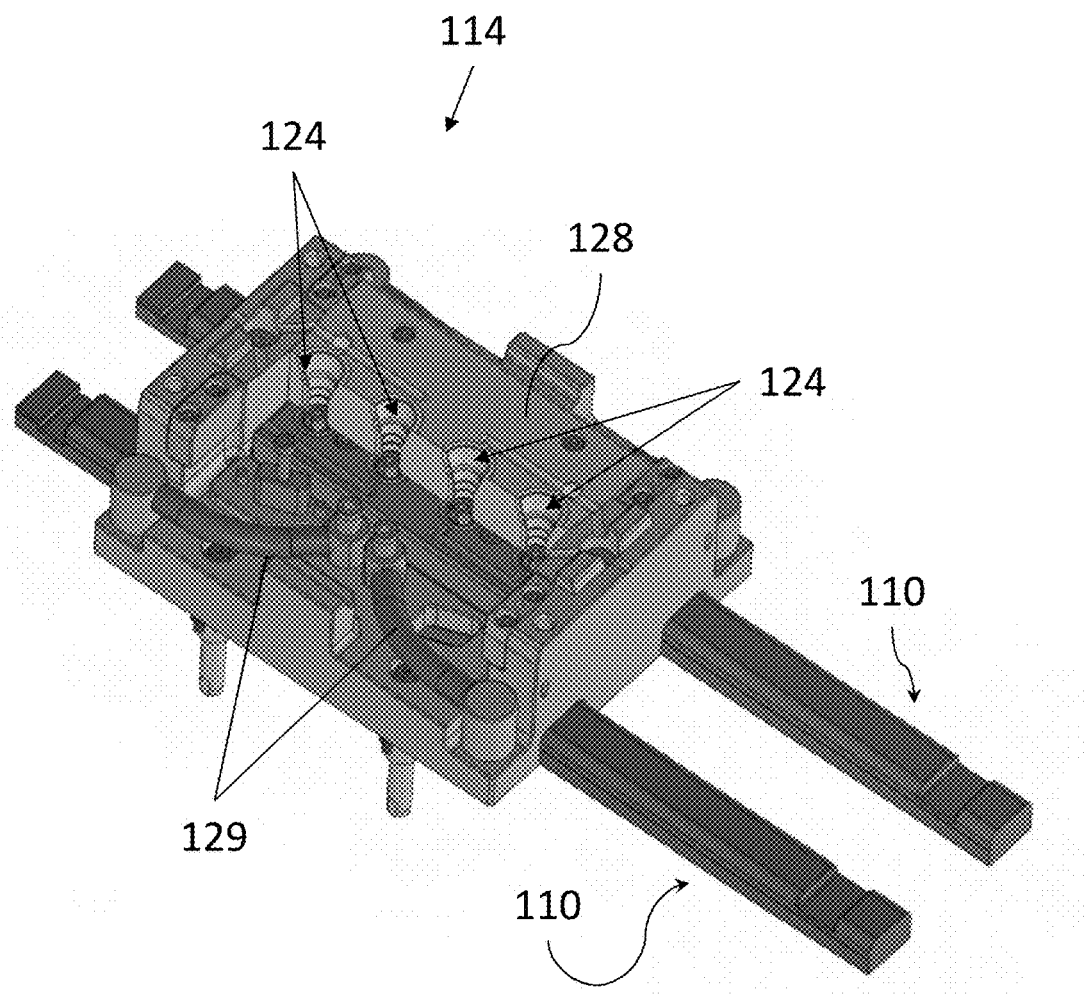
FIG. 11 is an isometric view of a partial cavity insert having sine bars.
Figure 12:
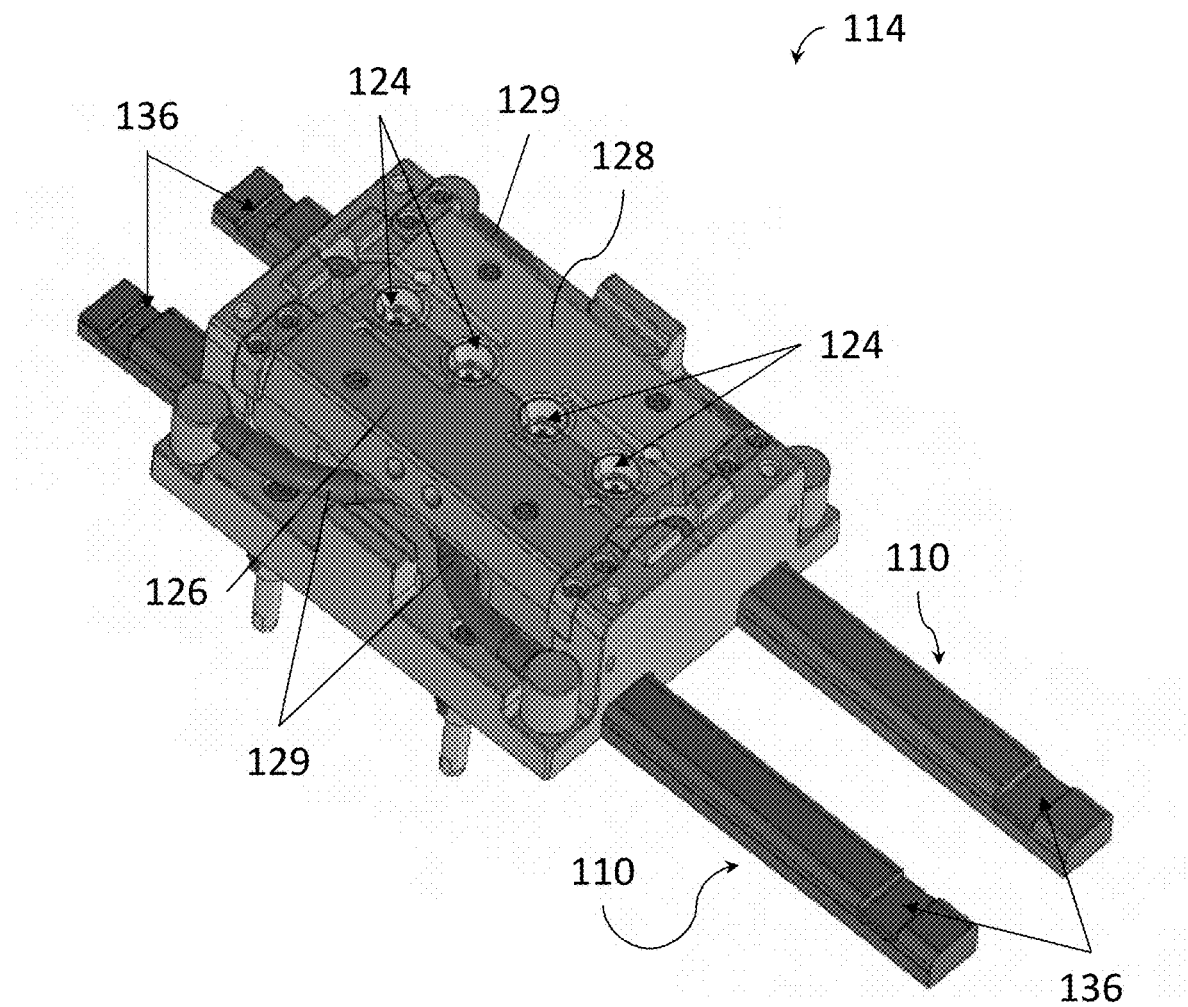
FIG. 12 is an isometric view of a cavity insert having sine bars.
Figure 13:
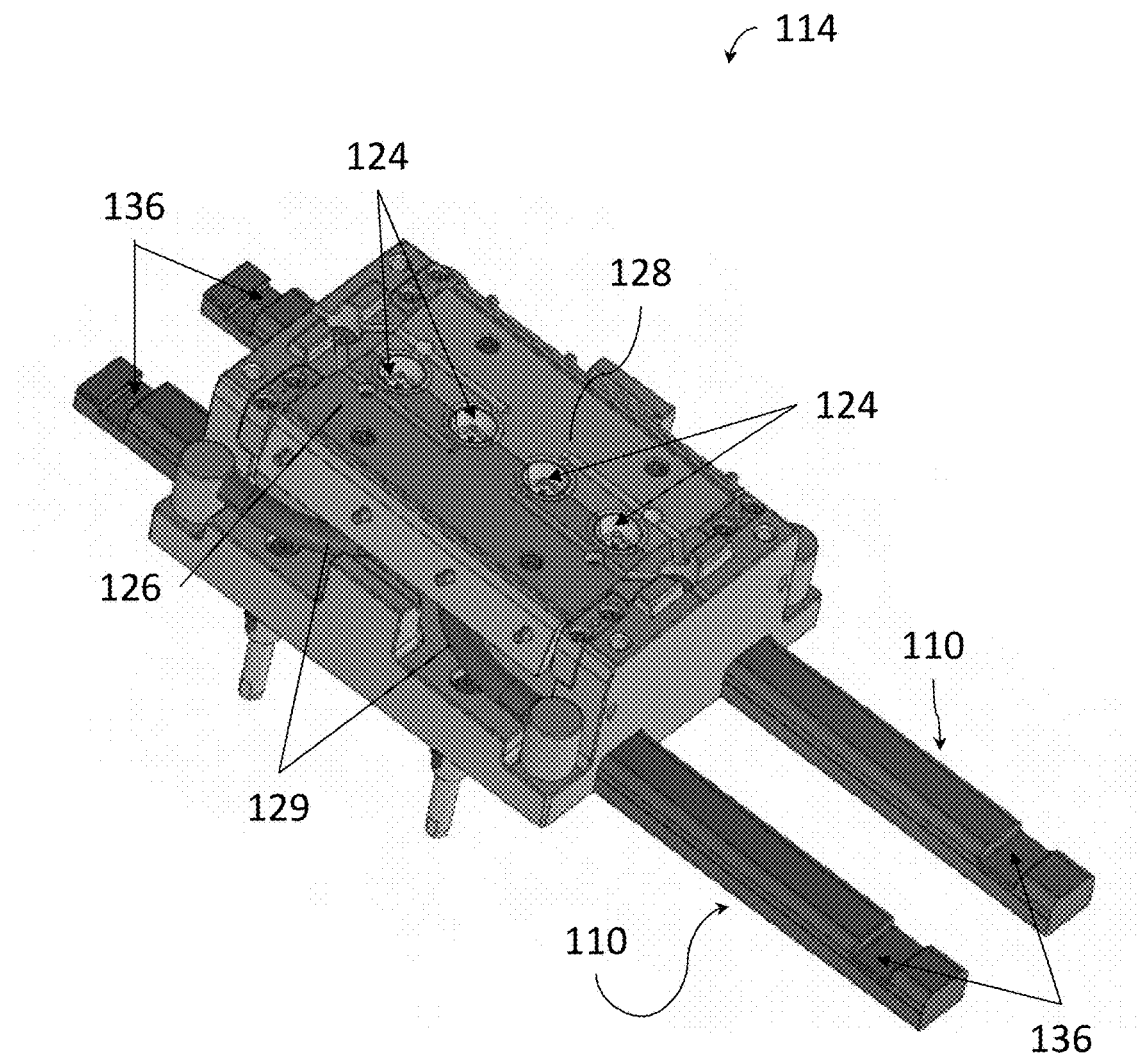
FIG. 13 is another isometric view of the cavity insert having sine bars.

Referring to FIGS. 8-10, which illustrate the reverse or bottom surface of the first plate 102a, the bottom surface 120 of the cavity insert 114 includes at least one roller 134. For example, each of the first and second cavity insert sections 126, 128 can include at least one roller 134. In addition, the cavity insert 114 includes at least one tab 132 (FIGS. 9-10), such as at least one tab 132 coupled to each cavity insert section 126, 128. In an embodiment, each tab 132 is positioned in an angled orientation such that the tab 132 does not extend parallel to the side of the cavity insert 114.

As illustrated by FIGS. 11-16, at least one sine bar 110 is coupled to the bottom surface 120 of the cavity insert 114. For example, as particularly illustrated in FIG. 16, at least one sine bar coupler 122 can couple the sine bar(s) 110 to the cavity insert 114. Each of the sine bars 110 in the modular pod 100 are coupled together, such as by sine bar couplers 122, to form a sine bar linkage 138 that couples to the sine bar connector link 108.

Figure 14A:
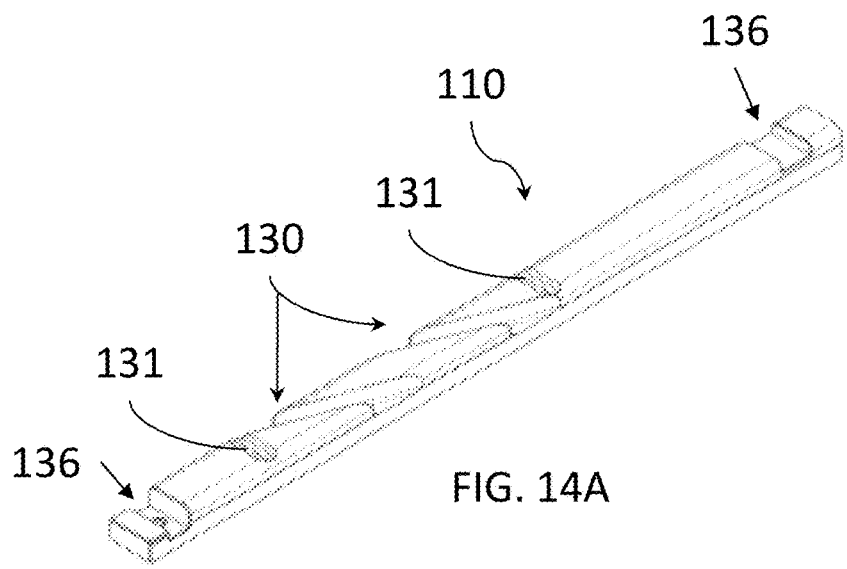
FIGS. 14A-B are illustrative views of sine bars.
Figure 14B:
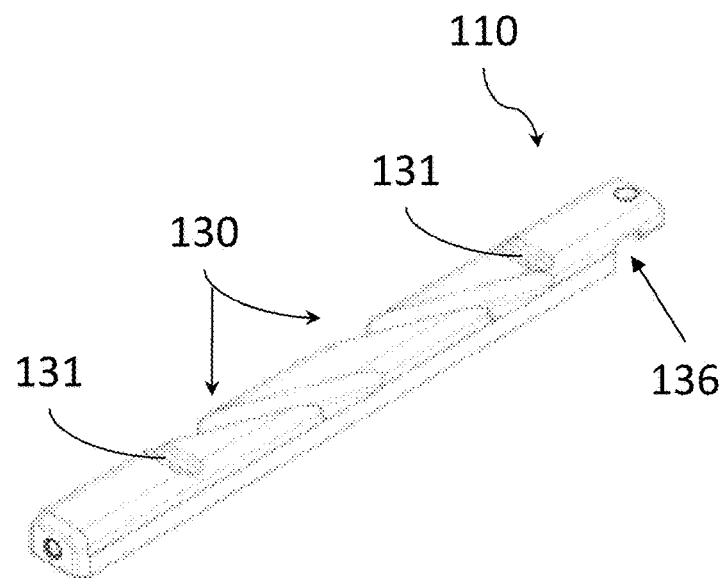
Figure 15:
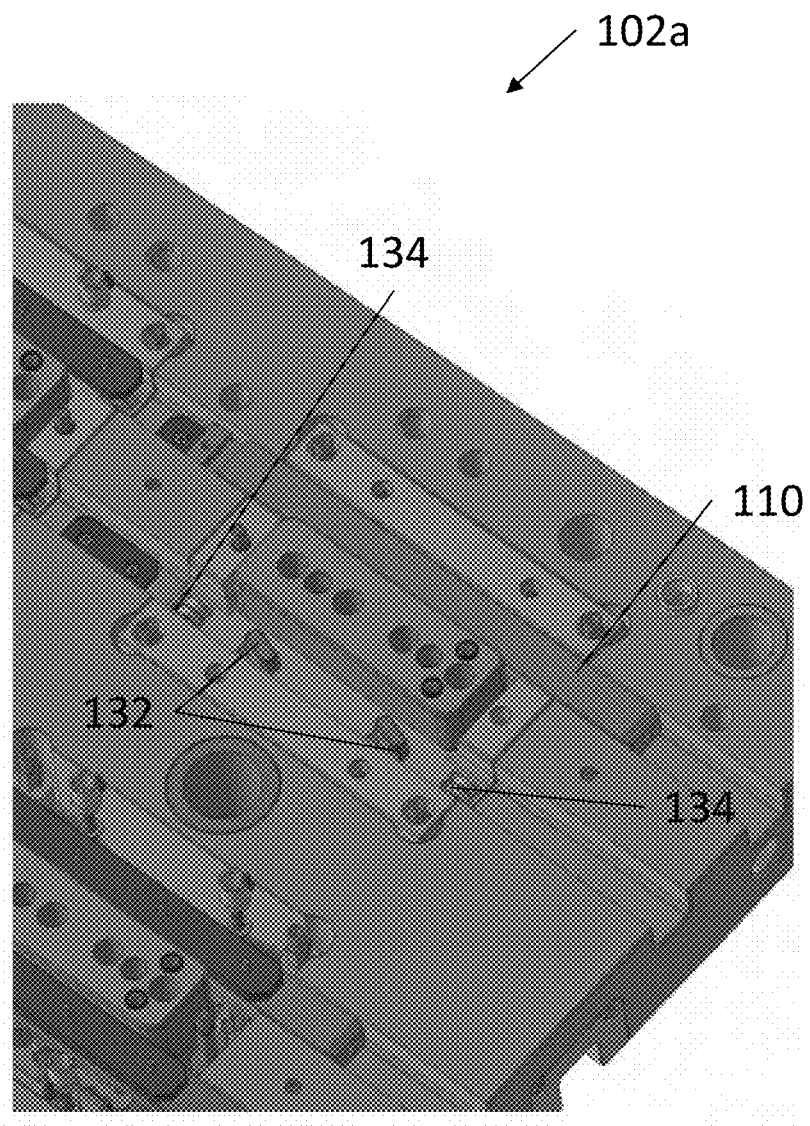
FIG. 15 is a partial isometric view of the bottom surface of the layer of the modular core illustrating partial installation of a sine bar.
Figure 16:
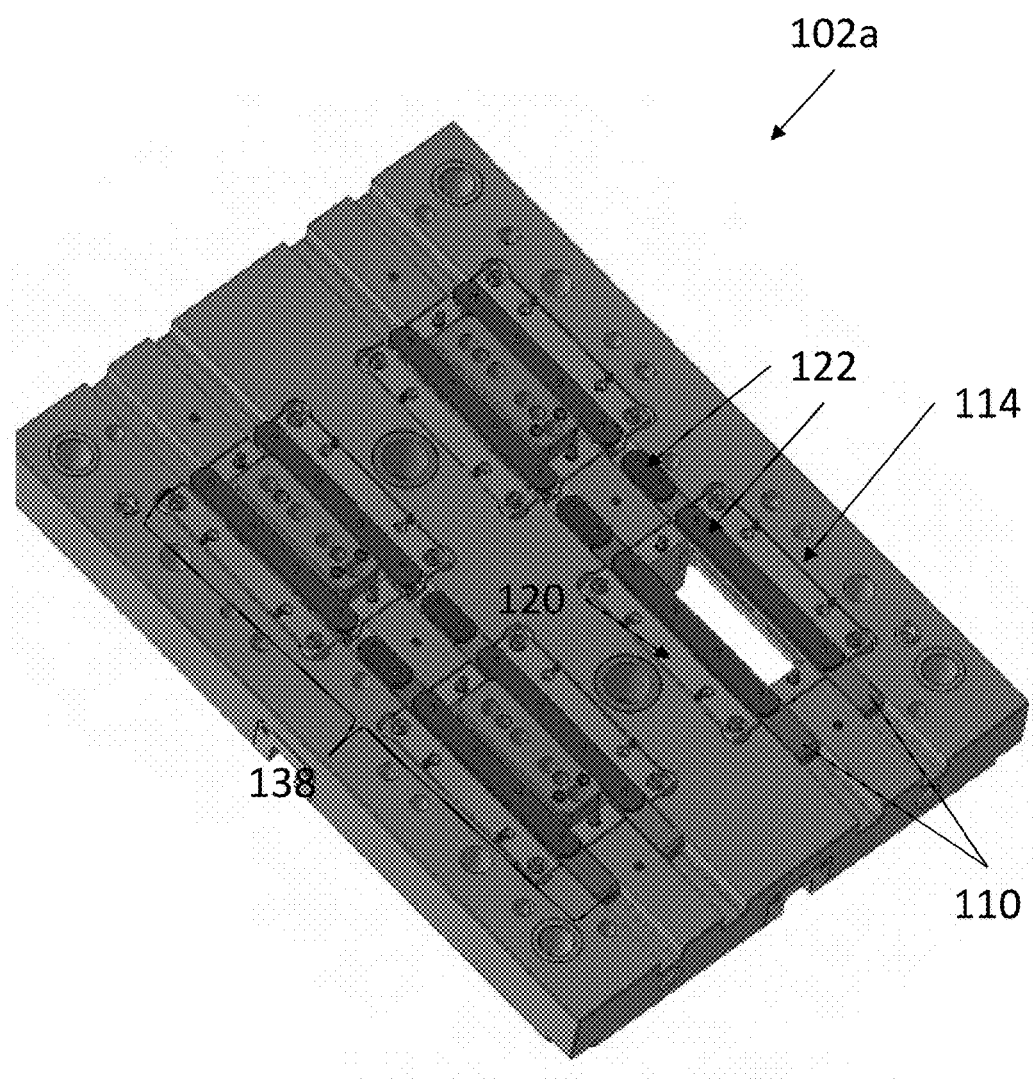
FIG. 16 is an isometric view of the bottom surface of the layer of the modular core illustrating installation of the sine bars.

As illustrated in FIGS. 14A-14B, each sine bar 110 includes a plurality of angled slots 130. In addition, each sine bar 110 includes at least one roller slot 131. Each sine bar 110 also includes at least one linkage interface surface 136.

Figure 17:
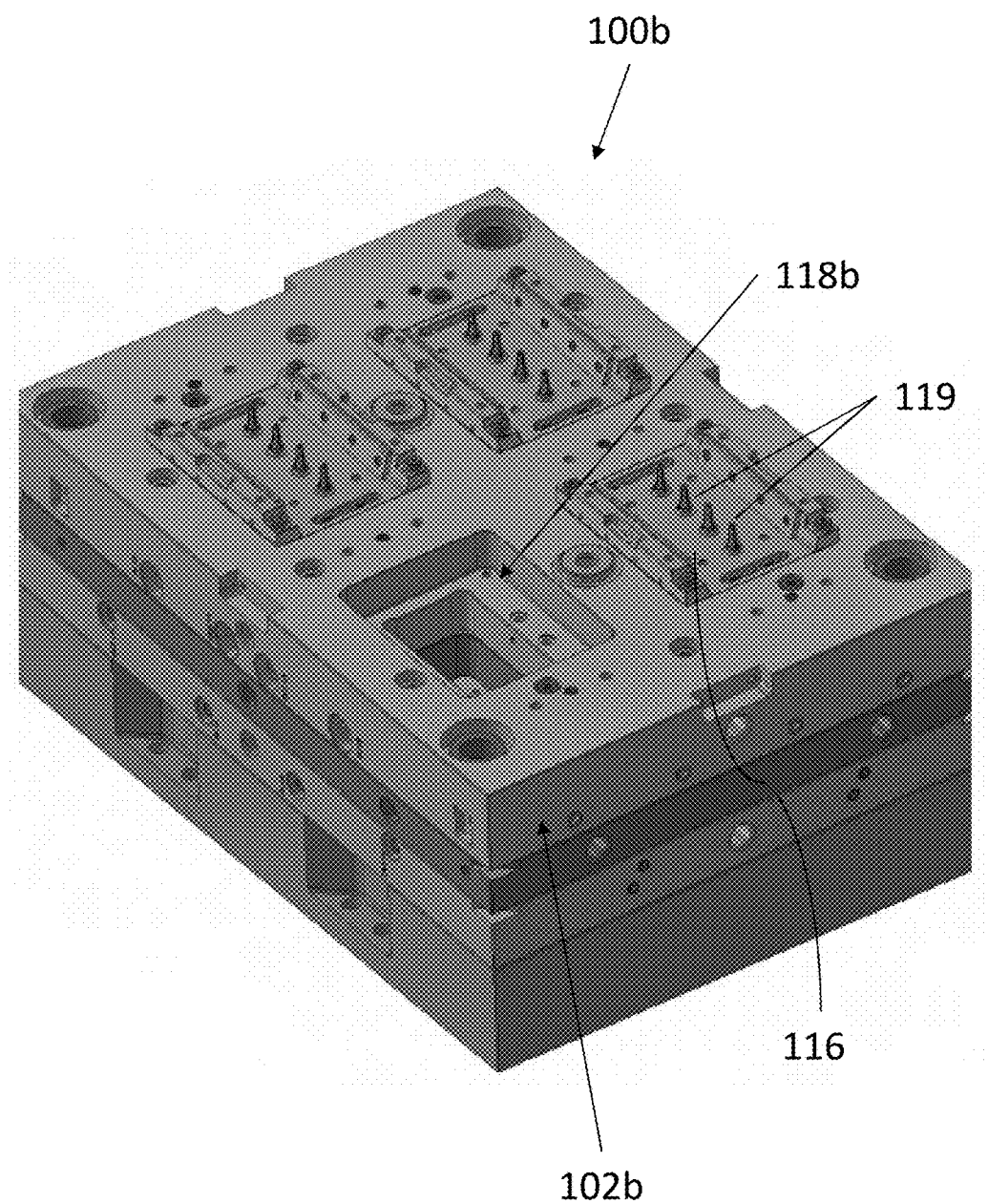
FIG. 17 is an isometric view of a section of the modular pod with a core insert removed.

FIG. 17 is an isometric view of a second section 100b of the modular pod 100. As illustrated in FIG. 1, the first section 100a and the second section 100b of the modular pod 100 are positioned adjacent to each other when the modular pod 100 is assembled. In this embodiment, the second section 100b retains a second type of molding insert, which in the illustrated embodiment is a core insert 116. As illustrated by FIG. 17, the section 100b includes a plurality of core inserts 116. In an example, the number of core inserts 116 corresponds to the number of cavity inserts 114 retained in the first section 100a. Each core insert 116 is received in an opening 118b of the second section 100b. In an example, the shape of each opening 118b corresponds to the exterior shape of each core insert 116. The core inserts 116 can be releasably retained in the openings 118b by any suitable means such as a snap-fit, friction fit, or by means of a fastener, among others.

As illustrated in FIGS. 17-21, each core insert 116 includes at least one individual core 119. For example, the number of cores 119 in each core insert 116 can correspond to the number of mold cavities 124 in each cavity insert 114. In the example illustrated here, each core insert 116 includes four (4) individual cores 119.

Figure 18:
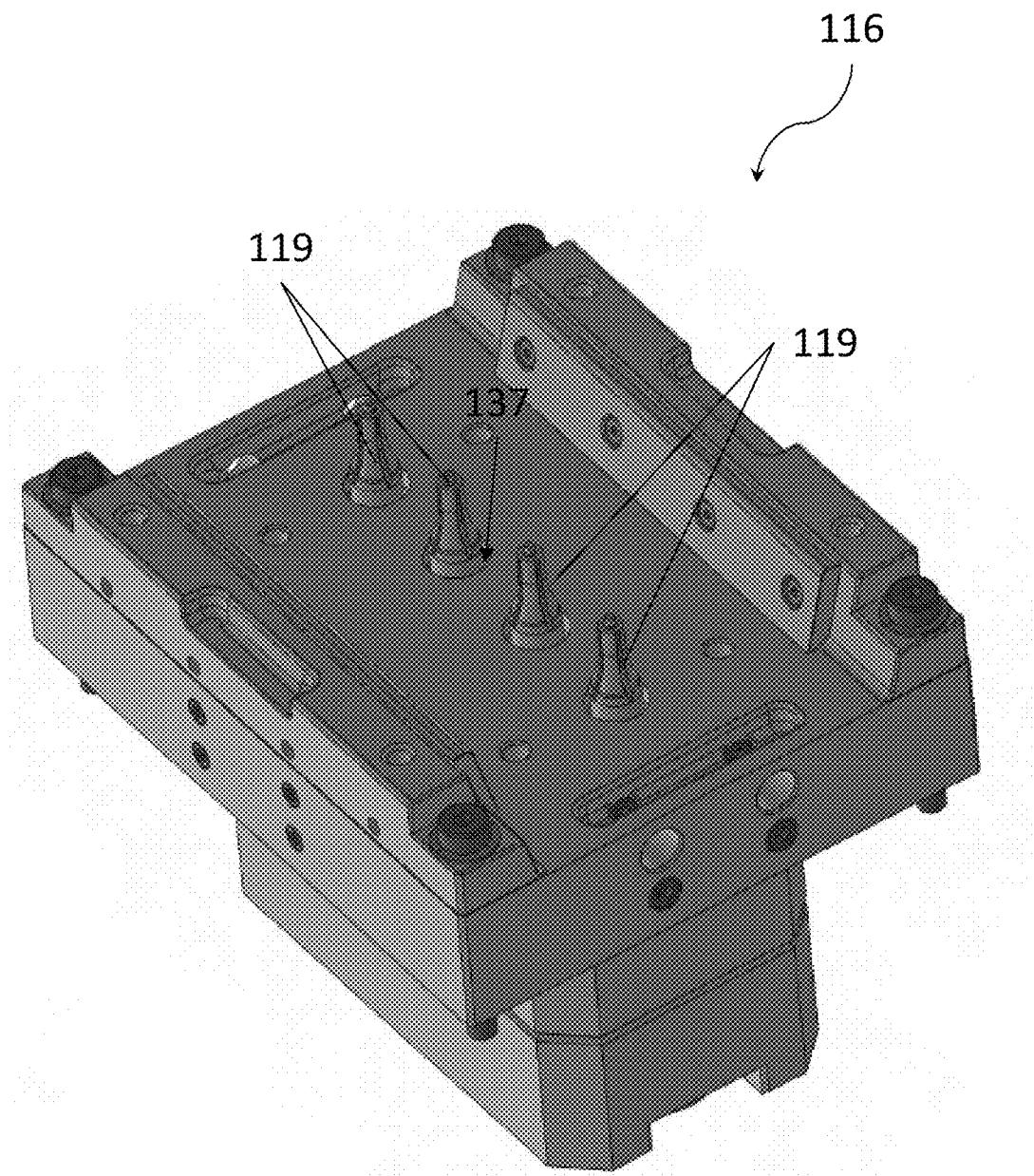
FIG. 18 is a top isometric view of the core insert.
Figure 19:
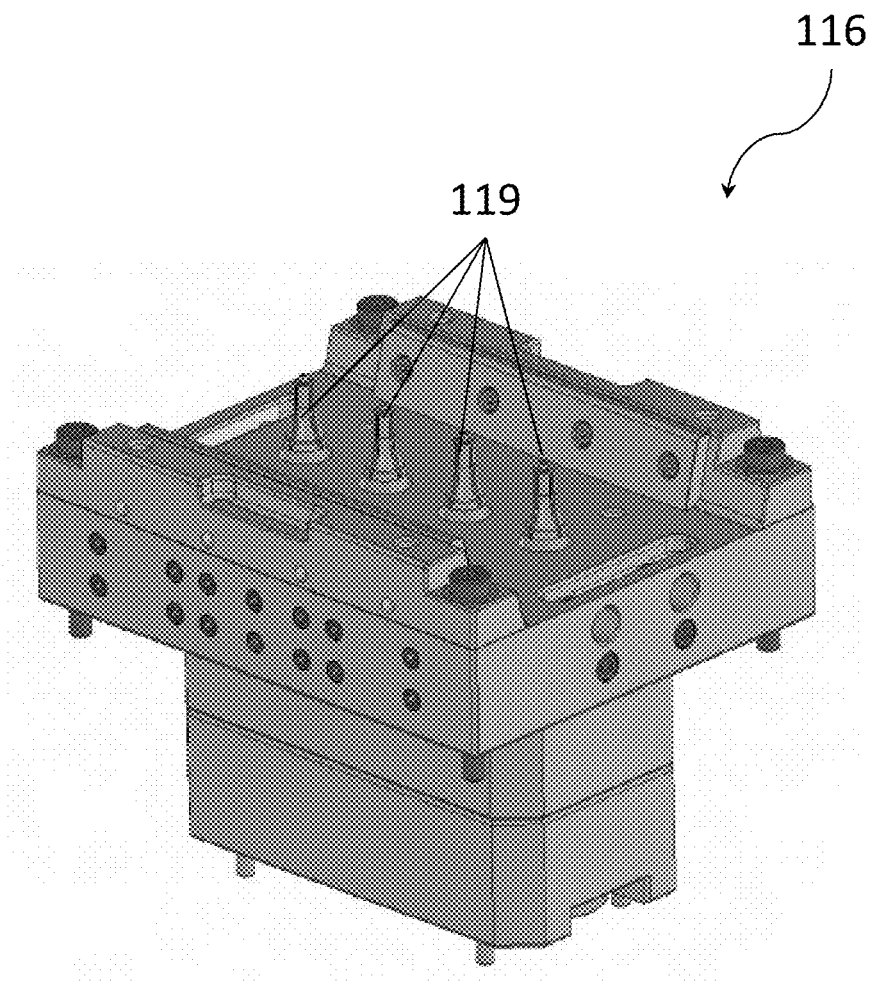
FIG. 19 is a side isometric view of the core insert.
Figures 22A, 22B:
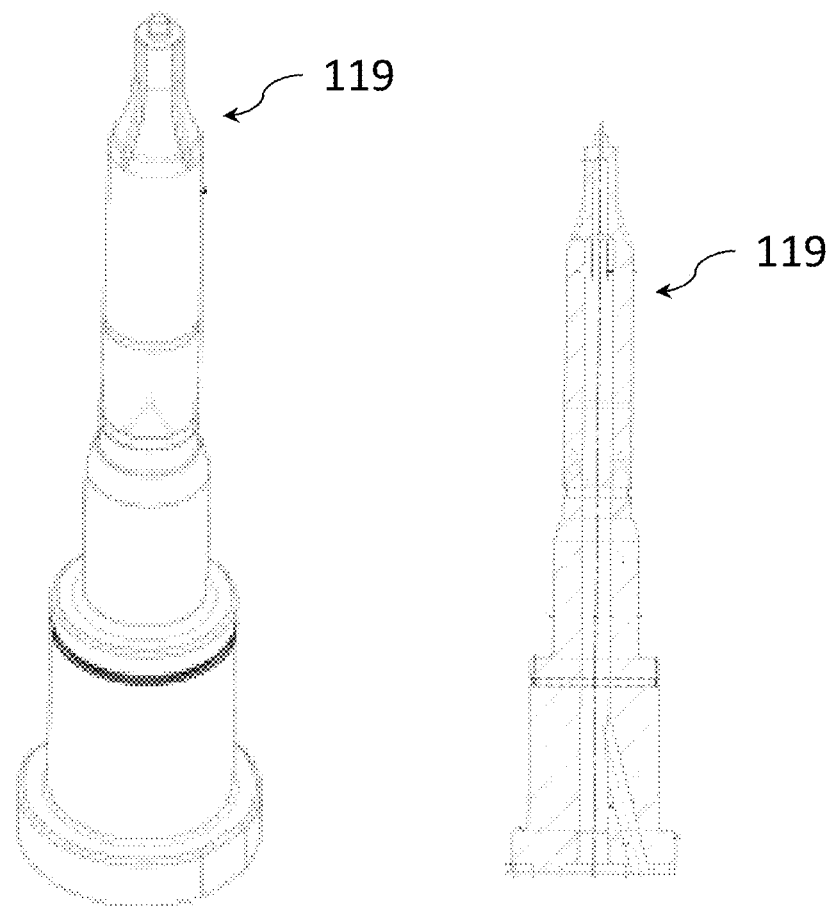
FIGS. 22A-B are illustrative views of an individual core of the core insert.

Each core 119 is shaped to form the desired shape of an inner surface of a molded part. In this example and as best illustrated in FIGS. 22A-22B, the cores 119 are shaped to form the inner surface of a tampon applicator. It is to be understood that the cores can be shaped to form any suitable type of part. As illustrated by FIG. 18, each core insert 119 is received in an opening 137 extending through the core insert 116.

Each core insert 116 and cavity insert 114 can be removably coupled to the modular pod 100. Thus, if a problem occurs with one of the molds, the relevant core insert 116 and/or cavity insert 114 can be removed and replaced with an operable replacement. This replacement can occur quickly, requiring a production line to be inoperable for only a minimal period of time.

In operation, the first and second cavity mold sections 126, 128 interact with the sine bars 110 to trigger the first and second cavity mold sections 126, 128 to engage and disengage each other. For example, when the sine bar connector link 108 is operated or engaged, the cavity mold sections 126, 128 disengage from each other.

The slots 130 of each sine bar 110 are positioned to cooperate with the tabs 32. When the sine bar connector link 108 is engaged, the sine bars 110 slide along the bottom surface of the cavity insert 114 with the slots 130 sliding along the tabs 132 and the tabs 132 positioned within the slots 130, said tabs 132 acting as guides and as stops for the sine bars 110.

In addition, each roller slot 131 cooperates with at least one roller 134 on the bottom surface 120 of each cavity insert section 126, 128. When the cavity insert sections 126, 128 engage or contact each other, the rollers 134 of the cavity insert sections 126, 128 rest or are received in the roller slots 131. When the sine bar connector link 108 is operated and the cavity insert sections 126, 128 disengage from each other, the rollers 134 roll out of the roller slots 131, contacting the cavity insert sections 126, 128 and pushing the cavity insert sections 126, 128 upward. Disengaging or separating the cavity mold sections 126, 128 reveals the molded parts, which in the illustrated embodiment rest on the individual core(s) 119. Due to the hourglass shape of the cavities, illustrated in FIG. 11, the contact of the rollers 134 with the cavity insert sections 126, 128 lifts and releases the molded parts from the surface of the mold, such as from the surface of the individual cores 119. A collection device can collect each part from the individual cores 119 on which the parts are loosely resting. Thus, each molded part can be removed from the cavity molds using simple, purely mechanical means, without employing hydraulics.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements it will be understood that the exemplary embodiments can be practiced utilizing either less than or more than the certain number of elements.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for ejecting a molded part from a mold comprising at least one molding insert removably coupled to a plate, the at least one molding insert comprising a first molding insert section and a second molding insert section that contacts the first molding insert section to form a molded part, a first sine bar coupled to the first molding insert section and a second sine bar coupled to the second molding insert section, the first and second sine bars each having a roller slot, and at least one roller coupled to each of the first and second molding insert sections, the at least one roller received in the roller slot of the first and second sine bar when the first and second molding insert sections are in contact with each other, the method comprising:
   activating the first and second sine bars to separate the first molding insert section from the second molding insert section; and
   moving the first and second sine bars along the first and second molding insert sections, said moving causing the at least one roller to roll out of the roller slot of each of the first and second sine bars and make contact with the first and second molding insert sections to release the molded part from the mold.

2. The method of claim 1, wherein the mold comprises an injection mold.

3. The method of claim 1, wherein each of the first and second molding insert sections comprises at least one tab coupled to a bottom surface of the first and second molding insert sections.

4. The method of claim 3, wherein each of the first and second sine bars comprises at least one slot configured to cooperate with the at least one tab.

5. The method of claim 4, wherein moving said first and second sine bars comprises moving said sine bars with the at least one tab retained within the at least one slot.

6. The method of claim 1, wherein the method of ejecting comprises a mechanical method of ejecting the molded part.

7. A modular pod for an injection mold, comprising:
   a first plate;
   a second plate adjacent to the first plate;
   a first molding insert releasably coupled to the first plate;
   a second molding insert releasably coupled to the second plate, the second molding insert configured to releasably contact the first molding insert to form a part mold, the second molding insert comprising:
      a first molding insert section;

a second molding insert section adjacent to the first molding insert section and configured to make contact with the first molding insert section to define the second molding insert;

a first sine bar coupled to the first molding insert section and a second sine bar coupled to the second molding insert section, the first and second sine bar each having a roller slot; and at least one roller coupled to each of the first molding insert section and the second molding insert section, the at least one roller configured to be received in the roller slot of each sine bar when the first molding insert section is in contact with the second molding insert section, wherein the first molding insert is configured to be removed from the first plate and the second molding insert is configured to be removed from the second plate upon malfunction.

8. The modular pod of claim 7, wherein each roller is configured to roll out of the roller slot and contact the first molding insert section and second molding insert section when the first molding insert section and second molding insert section separate to release a molded part from the second molding insert.

9. The modular pod of claim 8, wherein the second molding insert comprises a cavity insert having a plurality of mold cavities.

10. The modular pod of claim 9, wherein the first molding insert comprises a core insert having a plurality of individual cores.

11. The modular pod of claim 7, wherein each of the first molding insert and second molding insert is configured to be replaced when identified as having malfunctioned.

12. An injection mold, comprising:
a first modular pod comprising a first plurality of removable molding inserts; and
a second modular pod comprising a second plurality of removable molding inserts, each of the removable molding inserts comprising:
a first molding insert section;
a second molding insert section adjacent to the first molding insert section and configured to make contact with the first molding insert section to define the removable molding insert;
a first sine bar coupled to the first molding insert section and a second sine bar coupled to the second molding insert section, each sine bar having a roller slot; and
at least one roller coupled to each of the first molding insert section and the second molding insert section, the at least one roller configured to be received in the roller slot when the first molding insert section is in contact with the second molding insert section,
wherein each molding insert of the first plurality of removable molding inserts and the second plurality of removable molding inserts is configured to be removed when identified as malfunctioning.

13. The injection mold of claim 12, wherein each of the first and second plurality of removable molding inserts comprises a cavity insert having a plurality of mold cavities.

14. The injection mold of claim 13, wherein the first modular pod comprises a third plurality of removable molding inserts and the second modular pod comprises a fourth plurality of removable molding inserts, each of the third and fourth pluralities of removable molding inserts comprising a core insert having a plurality of individual cores.

* * * * *